United States Patent [19]
Cooper

[11] Patent Number: 5,113,946
[45] Date of Patent: May 19, 1992

[54] FIRE-FIGHTING SYSTEM

[76] Inventor: Grant S. Cooper, P.O. Box 317, Esparto, Calif. 95627

[21] Appl. No.: 636,762

[22] Filed: Jan. 2, 1991

[51] Int. Cl.$^5$ .................... A62C 27/00; A62C 3/02; A62C 31/00; B05B 9/03
[52] U.S. Cl. .................................. 169/24; 169/52; 239/148
[58] Field of Search ............... 169/24, 52; 239/148, 239/379

[56] References Cited

U.S. PATENT DOCUMENTS

| | | |
|---|---|---|
| 1,953,331 | 4/1934 | Armstrong . |
| 2,424,468 | 7/1947 | Keathley . |
| 2,561,701 | 7/1951 | Hurlbert . |
| 2,946,598 | 7/1960 | Foster . |
| 3,155,319 | 11/1964 | Hammelmann . |
| 3,605,908 | 9/1971 | McDonald et al. . |
| 3,724,554 | 4/1973 | Rupert et al. . |
| 3,770,060 | 11/1973 | Forsyth et al. . |
| 3,785,439 | 1/1974 | Britt . |

FOREIGN PATENT DOCUMENTS

| | | | |
|---|---|---|---|
| 121161 | 5/1947 | Australia | 169/52 |
| 125234 | 11/1984 | European Pat. Off. | 169/24 |
| 252202 | 1/1988 | European Pat. Off. | 169/24 |
| 348385 | 12/1989 | European Pat. Off. | 169/24 |
| 1463248 | 12/1966 | France | 169/24 |
| 466933 | 11/1951 | Italy | 169/24 |

Primary Examiner—Margaret A. Focarino
Assistant Examiner—James M. Kannofsky
Attorney, Agent, or Firm—Thomas R. Lampe

[57] ABSTRACT

A fire-fighting system including a tractor and tanks mounted on the tractor at different elevations. The tanks are filled with water and during dispensing of the water during fire-fighting the tanks are emptied in order from the top-most down.

11 Claims, 2 Drawing Sheets

FIRE-FIGHTING SYSTEM

TECHNICAL FIELD

This invention relates to a system for extinguishing fires. More particularly, the system encompasses highly versatile and stable apparatus particularly adapted for use in fighting grass, brush and forest fires and a method which may be carried out through utilization of the apparatus. A conventional tractor incorporating endless treads or tracks may readily be retrofitted to carry out the teachings of the present invention.

BACKGROUND ART

The following U.S. Pat. Nos. relate to various types of fire-fighting equipment: 3,770,060, 3,724,554, 2,561,701, 1,953,331, and 3,155,319.

U.S. Pat. Nos. 2,424,468 and 3,605,908 relate to spraying machines utilized in connection with motorized vehicles.

U.S. Pat. No. 3,785,439 discloses a tractor canopy sprinkler system which is employed on crawler tractors. A tractor canopy includes one or more water receiving tanks connected by conduit means to a sprinkler system proximate the tractor engine. A pump withdraws water from the tanks for spraying the same toward the engine in the event of fire.

U.S. Pat. No. 2,946,598 discloses a tractor with fender and cab-defining tanks. More particularly, the tanks are filled with liquid to increase the traction of the rear driving wheels of a conventional farm tractor.

U.S. Pat. No. 3,785,439 discloses a dual saddle tank for trucks including means for equalizing the levels of the tanks.

The above-identified patents do not disclose applicant's system wherein tanks are employed on a crawler-type tractor in such a manner as to maintain stability of the tractor during use. Furthermore, the prior art arrangements do not provide a teaching of the features of applicant's system which cooperate to maintain such stabilization during use.

With respect to many of the mobile fire-fighting devices known in the prior art, as exemplified by the patents cited above, such devices are characterized by their relative complexity and high expense. Furthermore, many such prior art arrangements are totally inappropriate for use in the rugged, hilly terrains where grass, brush and forest fires often must be fought.

DISCLOSURE OF INVENTION

The present invention encompasses an apparatus of relatively simple construction which includes a conventional crawler-type tractor. Such tractor may readily and relatively inexpensively be retrofitted to convert same into highly effective fire-fighting apparatus. Furthermore, apparatus constructed in accordance with the teachings of the present invention is highly stable and, as will be seen below, such stability can be maintained during use. The apparatus of the present invention is a versatile piece of equipment which can perform the usual brush clearing and bull dozing functions of a crawler-type tractor but also enables the operator to utilize same to direct water onto a fire. In addition, it can be used to shuttle water in rugged terrain to fire fighters using back-pack hand pumps. This permits more cost effective use of personnel and equipment.

The fire-fighting apparatus of the present invention incorporates a tractor including a tractor body and a pair of spaced endless treads movably mounted relative to the tractor body. The tractor has a predetermined center of mass and the tractor body includes a front body portion disposed to the front of the center of mass and a rear body portion disposed to the rear of the center of mass.

A first tank defines an interior for accommodating water therein. The first tank is attached to the tractor front body portion at a first location between the spaced endless treads and below the elevation of the tractor's center of mass. The first tank can conform to and surround a pre-existing belly pan or skid plate, or the first tank can be of unitary construction and replace the tractor belly pan in its entirety.

A second tank defines an interior for accommodating water therein. The second tank is attached to the tractor rear body portion at a second location above the elevation of the first location.

First conduit means defining a first fluid-flow passageway interconnects the interiors of the first and second tanks. Second conduit means is connected to the first tank and defines a second fluid-flow passageway in communication with the interior of the first tank.

Pump means operatively associated with the second conduit means pumps water through the second fluid-flow passageway from the first tank to dispense water therefrom. The first conduit means delivers water from the second tank interior to the first tank interior through the first fluid-flow passageway under the influence of gravity to replenish water dispensed from the first tank.

The first tank includes a bottom tank wall at least partially comprising a skid plate angling in a generally downward direction as the plate progresses from the front of the tractor toward the rear thereof, the skid plate being generally disposed under the engine of the tractor.

Other features, advantages, and objects of the present invention will become apparent with reference to the following description and accompanying drawings.

BEST MODE FOR CARRYING OUT THE INVENTION

Figure 1:
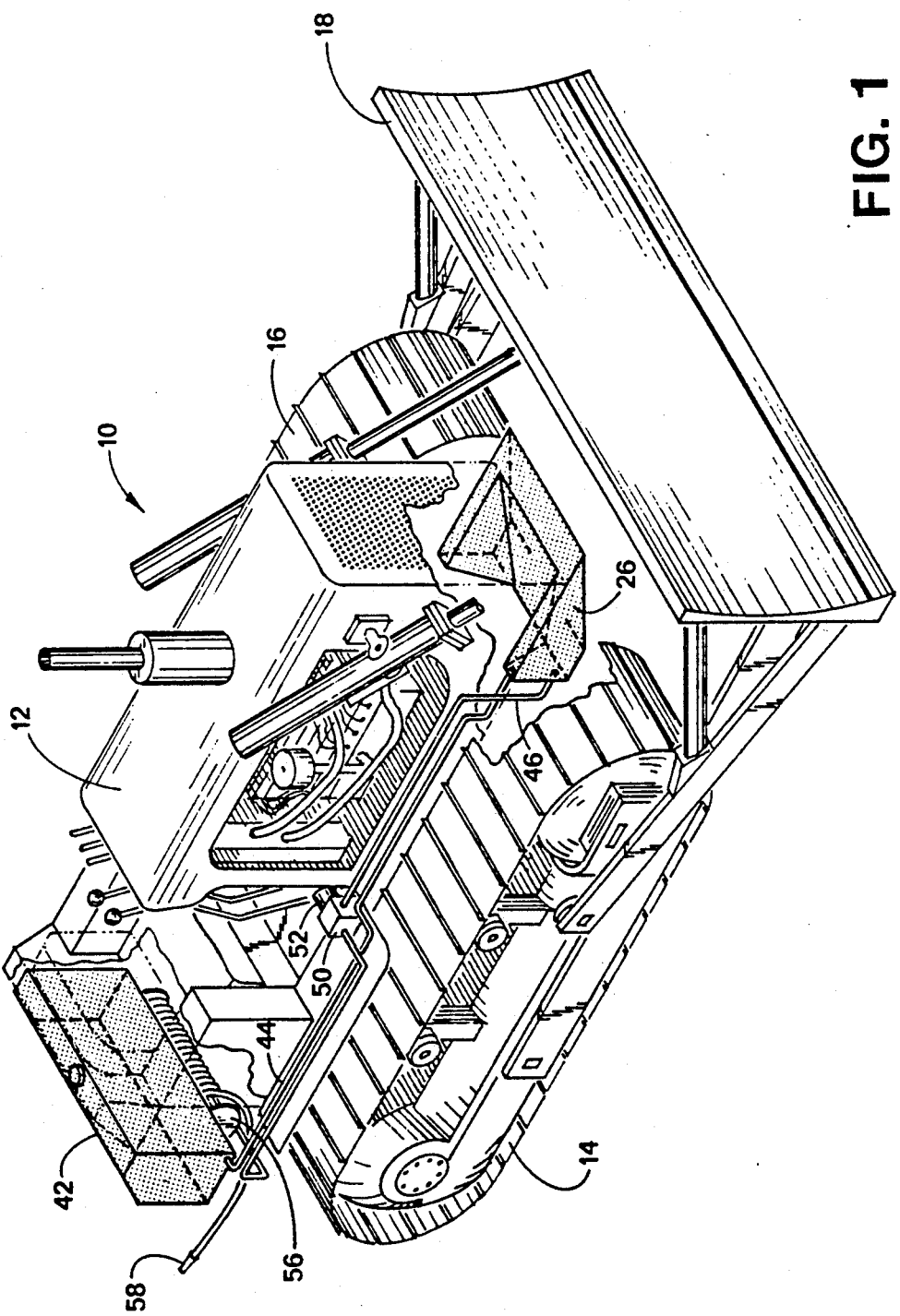
FIG. 1 is a perspective, partially diagrammatic view of apparatus constructed in accordance with the teachings of the present invention, with portions thereof broken away in the interest of clarity.

Referring now to the drawings, a tractor retrofitted in accordance with the teachings of the present invention is generally designated by reference numeral 10. As is conventional, the tractor includes a tractor body 12 and a pair of spaced endless treads 14, 16 movably mounted relative to the tractor body. The illustrated tractor also incorporates a conventional dozer arrangement 18 but it will be appreciated that such feature comprises no part of the present invention nor is it necessary for the practice thereof.

Figure 2:
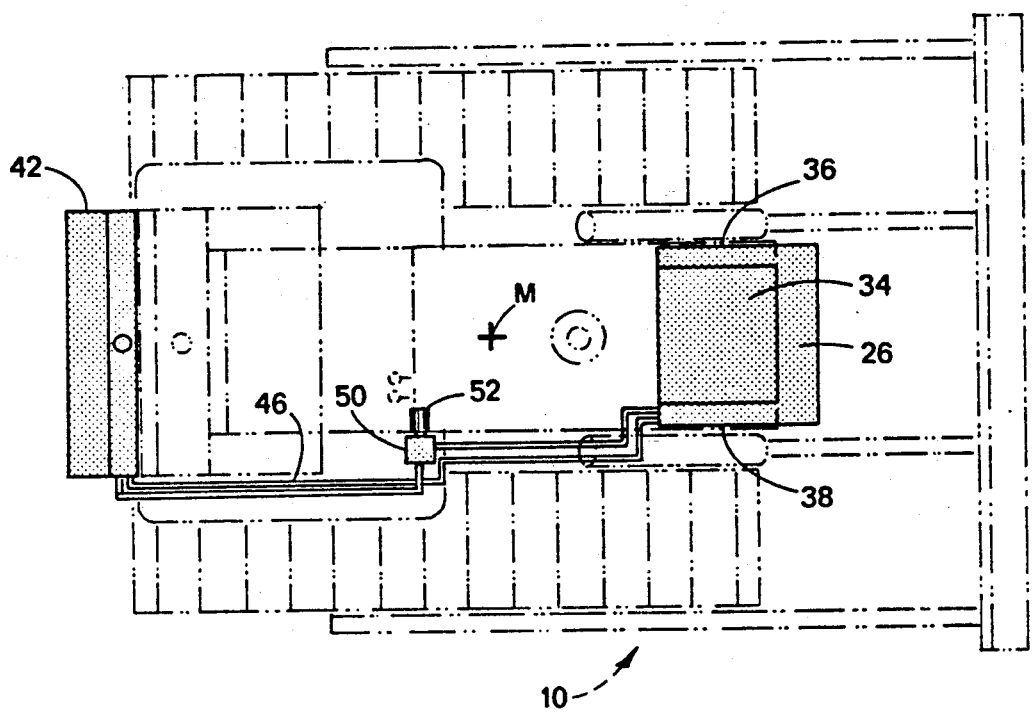
FIG. 2 is a top plan view of the apparatus of FIG. 1 with the tractor illustrated in phantom and other components of the apparatus disclosed schematically.
Figure 3:
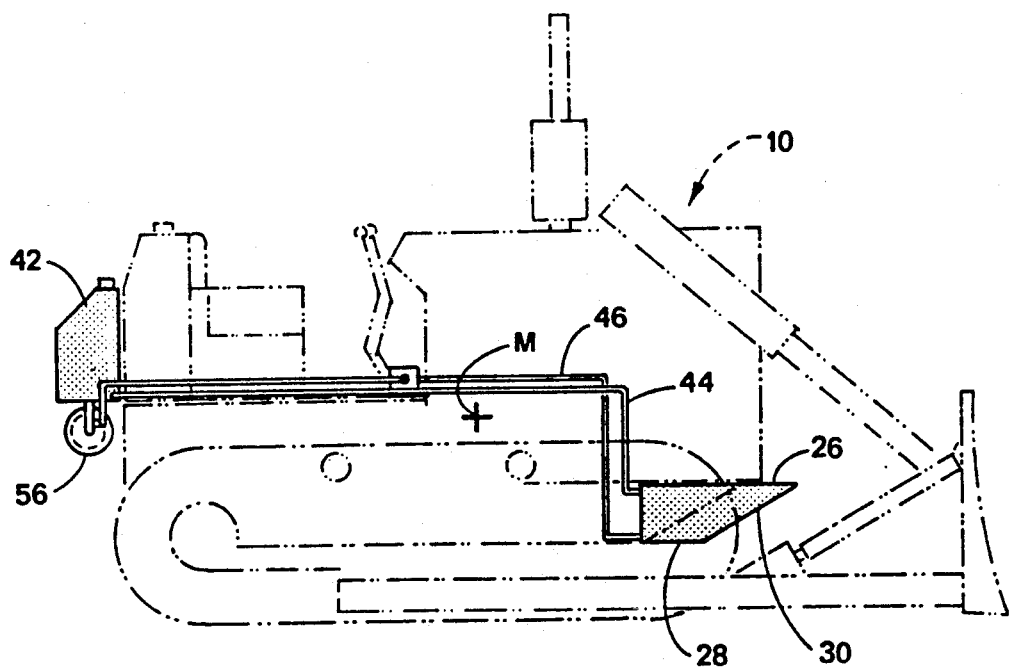
FIG. 3 is a side elevation view similar in character to that of FIG. 2.

The tractor 10 has a predetermined center of mass which is depicted in FIGS. 2, 3 and identified by reference letter M. It will be appreciated that auxiliary weight applied to the tractor through the addition of supplemental equipment and the like will tend to destabilize the tractor when applied above the elevation of the center of mass while tending to stabilize the tractor when applied below such elevation. It will also be appreciated that weight applied to the tractor either fore or aft of the center of mass M without the application of a counter balancing force on the other longitudinal side of the center of mass will further destabilize the tractor when the weight is located at an elevation above the center of mass.

The apparatus of the present invention additionally includes a plurality of tanks which define interiors to be filled with water. The water is to be dispensed from the tanks for the purpose of fire-fighting. While it is desirable to dimension the tanks to provide as much water capacity as possible, employment of large capacity tanks can destabilize even a heavy piece of equipment such as a crawler-type tractor. The problem becomes particularly acute when, as is often the case, the fighting of brush and forest fires must be carried out in uneven and hilly terrain. The apparatus of the present invention allows relatively high capacity water tanks to be added to a conventional crawler-type tractor without unduly stabilizing same. The tractor becomes increasingly bottom heavy during use since the tank or tanks which are disposed on the tractor above the level of the center of mass will be depleted first. This is far preferable to employing a tank depletion schedule which would render the tractor top heavy and increasingly unstable.

The tractor 10 has a front body portion, which is that portion thereof disposed to the front of the center of mass M. The tractor body also has a rear body portion, which is that portion thereof disposed to the rear of the center of mass. A first tank 26 is attached to the tractor front body portion at a first location between the spaced endless treads 14, 16 and below the elevation of center of mass M. The first tank defines an interior for accommodating water therein.

Preferably, first tank 26 is constructed of heavy gauge steel plate welded together or formed by any other suitable known fabrication technique. It should be noted that the first tank includes a bottom tank wall 28. The forward section of the wall 28 is in the nature of a skid plate 30 which angles in a generally downward direction as the plate progresses from the front of the tractor toward the rear thereof, as shown. The skid plate 30 is generally disposed under the engine of the tractor and, in the arrangement shown, projects somewhat from the front of the tractor body. Since the first tank 26 acts as a guard or bumper because of its location, it has been found that the steel plate of which it is constructed should be in the order of at least about three-eighths inch in thickness. First tank 26 may be secured to the tractor by any suitable expedient such as mechanical fasteners or by welding. If mechanical fasteners are employed, the tank may be readily removed from the tractor when desired so that the tractor may assume its customary condition and configuration.

The illustrated embodiment of first tank 26 defines an upwardly directed recess 34 which is for the purpose of accommodating a segment of the tractor first body portion. For example, the recess may accommodate the skid plate which normally projects downwardly from tractors of this type. The first tank additionally includes spaced side walls 36, 38, each of the side walls positioned closely adjacent to one of the endless treads. Preferably, the midpoint of the tank lies along the same longitudinal plane as center of mass M. With such configuration, the size of the first tank ca be maximized without destabilizing the tractor.

The apparatus also includes a second tank 42 defining an interior for accommodating water therein. The second tank is attached to the tractor rear body portion at a second location above the elevation of the location of the first tank. As with the first tank, the second tank may be secured to the tractor by any suitable known expedient. The second tank need not be constructed of as heavy a gauge of material as the first tank since the higher elevation and location of the second tank make it less likely that the tank will be subject to impact. As was the case with regard to the first tank, the second tank should be centered mid-width of the tractor. Since the first tank and the second tank are disposed on opposite (fore and aft) sides of the center of mass, their weights will tend to counter balance to some extent, thus helping maintain stability of the apparatus.

While the relative positioning of the first and second tanks just described provides an arrangement which is relatively stable even when the tanks are filled with water, stabilization of the tractor will be maintained when all the water in the tanks falls below the elevation of the center of mass. Thus, it is an object of this invention to create this condition as soon as possible. This change occurs during normal use of the system in a manner which will be described below.

A conduit 44 defines a first fluid-flow passageway interconnecting the interiors of the first and second tanks. The conduit extends from the bottom of second tank 42 to the top of first tank 26. Since second tank 42 is disposed at an elevation above that of first tank 26, water from tank 42 will flow under the influence of gravity to fill first tank 26 when the contents of such latter tank is being depleted.

A second conduit 46 leads from the bottom of the first tank 26 and defines a second fluid-flow passageway in communication with the interior thereof. The second conduit 46 is in communication with a water pump 50 mounted at a suitable location on the tractor. The pump 50 is operatively connected to a hydraulic motor 52 which, in turn, is operatively connected to the hydraulic system incorporated in tractor 10. This arrangement has not been shown in detail since hydraulic systems are well known components of tractors of this type. From the outlet of water pump 50 the second conduit 46 proceeds to a hose reel 56 with the hose about the reel comprising an extension of conduit 46. A nozzle 58 enables the user to direct the pumped water to the desired location. Alternatively, the motor could be an internal combustion engine or any other suitable type of prime mover.

As the water is pumped from the first tank 26 through the second conduit 46, the first conduit 44 delivers water from the second tank interior to the first tank interior through the fluid-flow passageway defined by the first conduit. In this manner the water dispensed from the first tank will be replenished as dispensing continues. The combined center of mass of the two tanks will continually move lower during the operation.

I claim:

1. Fire fighting apparatus comprising, in combination:
a tractor including a tractor body and a pair of spaced endless treads movably mounted relative to said tractor body, said tractor having a predetermined center of mass and said tractor body including a front body portion disposed to the front of said center of mass and a rear body portion disposed to the rear of said center of mass;

a first tank defining an interior for accommodating water therein, said first tank being attached to said tractor front body portion at a first location between said spaced endless treads and below the elevation of said center of mass;

a second tank defining an interior for accommodating water therein, said second tank being attached to said tractor rear body portion at a second location above the elevation of said first location;

first conduit means defining a first fluid-flow passageway interconnecting the interiors of said first and second tanks;

second conduit means connected to said first tank and defining a second fluid-flow passageway in communication with the interior of said first tank; and pump means operatively associated with said second conduit means for pumping water through said second fluid-flow passageway from said first tank to dispense water from said first tank, said first conduit means delivering water from said second tank interior to said first tank interior through said first fluid-flow passageway under the influence of gravity to replenish water dispensed from said first tank.

2. The apparatus according to claim 1 wherein said second conduit means includes a manually manipulable hose and nozzle.

3. The apparatus according to claim 1 wherein said first conduit means is connected at the top of said first tank and at the bottom of said second tank.

4. The apparatus according to claim 1 wherein at least one of said tanks is selectively removable from said tractor.

5. The apparatus according to claim 1 additionally comprising prime mover means for operating said pump means.

6. The apparatus according to claim 5 wherein said prime mover means is a hydraulic motor operatively connected to a hydraulic system incorporated in said tractor.

7. The apparatus according to claim 1 wherein said first tank includes a bottom tank wall at least partially comprising a skid plate angling in a generally downward direction as said plate progresses from the front of said tractor toward the rear thereof, said skid plate being generally disposed under the engine of said tractor.

8. The apparatus according to claim 7 wherein said first tank additionally includes spaced side walls connected to said bottom tank wall, each of said side walls positioned closely adjacent to one of said endless treads.

9. The apparatus according to claim 7 wherein said first tank defines an upwardly directed recess for accommodating a predetermined segment of said tractor first body portion.

10. A method of dispensing water from fire fighter apparatus including a tractor and a plurality of water tanks mounted on said tractor at different elevations thereon, said method comprising the steps of:

pumping water from the interior of the lowermost tank of said plurality of water tanks;

conveying said pumped water through a fluid-flow passageway to at least one predetermined location;

maintaining fluid-flow communication between the interiors of all of said water tanks; and substantially simultaneously with said pumping and conveying steps, replenishing the water pumped from said lowermost tank by flowing water from a tank disposed at an elevation above said lowermost tank to said lowermost tank.

11. The method according to claim 10 wherein said lowermost tank is located below the elevation of the center of mass of said tractor and wherein the water flows to said lowermost tank from said tank disposed at an elevation above said lowermost tank under the influence of gravity.

* * * * *